Aug. 9, 1938.   H. A. BERLINER   2,125,882
AIRCRAFT CONSTRUCTION
Filed March 17, 1937

INVENTOR.
HENRY A. BERLINER
BY McConkey & Booth
ATTORNEYS.

Patented Aug. 9, 1938

2,125,882

UNITED STATES PATENT OFFICE 2,125,882

AIRCRAFT CONSTRUCTION

Henry A. Berliner, Washington, D. C.

Application March 17, 1937, Serial No. 131,313

5 Claims. (Cl. 244—124)

This invention relates to airplane construction and more particularly to a formation of elongated hollow members in the form of sections which are adapted to be connected together.

One of the principal objects of the invention is to provide an airplane construction including a longitudinal hollow member formed in separate sections in which the sections are rigidly secured together throughout their entire circumference.

According to one arrangement, the airplane member is formed with an outer skin of sheet metal or the like which is reinforced throughout by a corrugated sheet secured to the skin. The different sections of the members may be attached together by means of flanged connecting parts secured to the respective skins and to the reinforcing sheets and adapted to be connected by rivets or the like.

Other objects, advantages and novel features of the invention will be apparent from the following description of the embodiments shown on the accompanying drawing, in which.

Figure 1:
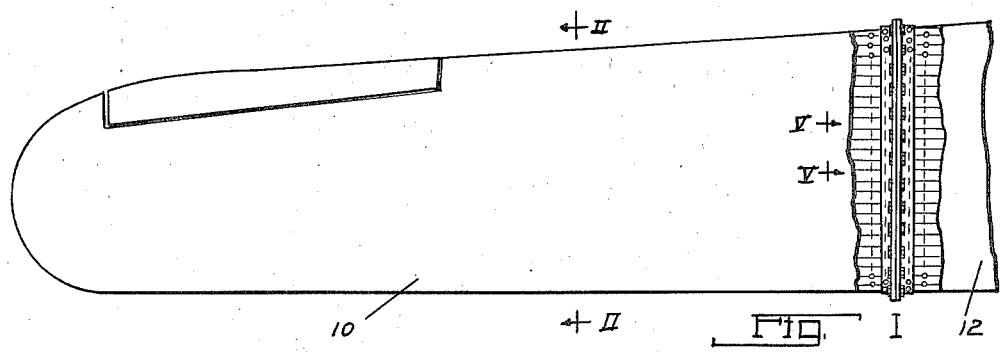
Fig. 1 is a partial plan view of an airplane wing, embodying the invention.

The wing illustrated in Fig. 1 is formed with tip sections 10 and a central section 12 adapted to be secured to the fuselage of an airplane, not shown. The tip sections 10 and central section 12 are separately built up and are adapted to be rigidly connected together when the airplane is assembled to form a complete wing.

Figure 2:
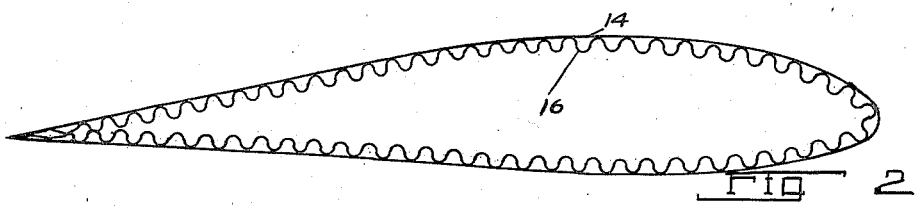
Fig. 2 is a section on the line II—II of Fig. 1.
Figure 3:
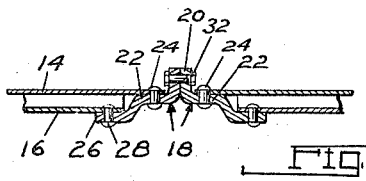
Figs. 3 and 4 are partial sections on the lines III—III and IV—IV of Fig. 5.

As best seen in Fig. 2, the wing sections are formed with an outer skin 14 of sheet metal or the like which is shaped to provide an aerofoil section and which is reinforced throughout its entire circumference by a corrugated sheet of metal or the like 16 which is arranged with its corrugations extending longitudinally of the wing. It will be apparent that, if desired, the reinforcing sheet 16 can be terminated short of the trailing or leading edge and that these edges can be reinforced by other suitable means. The sheet 16 and skin 14 are adapted to be connected by riveting, welding or the like at spaced points throughout the entire surface of the wing in order to provide an intimate bond therebetween.

Figure 4:
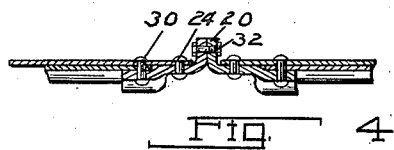
Figure 5:
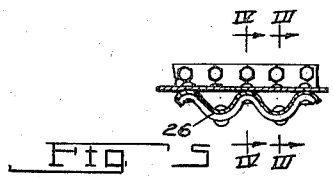
Fig. 5 is a partial section on the line V—V of Fig. 1.

After the several wing sections are built up in the manner described, they are provided at their meeting ends with connecting means illustrated as flanged brackets 18 having right angle flanged portions 20 and shouldered portions 22 adapted to lie in engagement with the near surface of the skin 14 adjacent the end thereof. The shouldered portions 22 are secured to the skin completely around the circumference thereof by means of a series of rivets indicated at 24. The brackets 18 are further formed with inwardly extending shouldered portions 26 which are corrugated to follow the contour of the sheet 16 as best seen in Fig. 5 and which are secured to the sheet 16 by means of a series of rivets 28. At those points where the sheet 16 lies in contact with the skin 14, a single rivet is preferably extended through the skin, the sheet, and the shouldered portion 26 as indicated at 30 in Fig. 4.

After the connecting brackets 18 have been secured to the skins and reinforcing sheets at the ends of the several sections, the sections are assembled with the flanged portions 20 in contact and these portions are secured together by means of a series of spaced bolts or the like 32. This effectively connects the skins and reinforcing sheets of the different sections throughout their entire circumference and provides a construction which is as strong and rigid as the remainder of the sections. If desired the projecting flanges may be covered with strips of sheet metal or the like to leave a relatively smooth surface.

Figure 6:
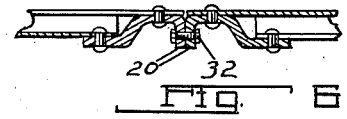
Fig. 6 is a view similar to Fig. 3 showing a modified construction.

Fig. 6 illustrates a modified construction adapted particularly for use with large wings in which it is possible for the connection between the several wing sections to be made from inside the wing. In this construction instead of being turned out as in Figs. 1 to 5 the flange portions 20 have been turned in and are connected by bolts 32 applied from inside of the assembled wing.

Figure 7:
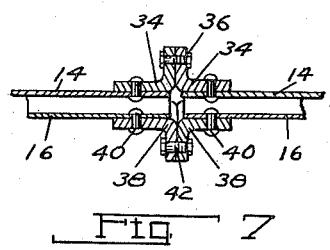
Figs. 7 and 8 are sections corresponding to Figs. 3 and 4 respectively of another modified construction.
Figure 8:
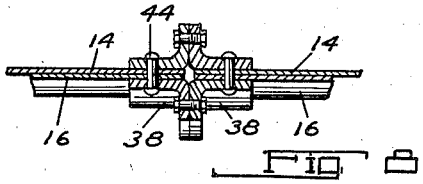

Figures 7 and 8 illustrate a further modified construction in which separate connecting members are provided for the skin and the corrugated reinforcing sheets. As shown in these figures L-section brackets 34 are riveted to the skin sections 14 and are adapted to be secured together by means of rivets 36. Similar brackets 38 shaped to conform to the corrugated sheet 16 are riveted to the ends of the sheet 16 by rivets 40 and may be secured together by means of rivets 42. Preferably at those points where the skin 14 and sheet 16 lie in contact, a single rivet 44 extends through both the skin and the sheet and the two brackets 34 and 38.

It will be understood that brackets of different shapes could be provided or that other changes could be made and it is accordingly not intended that the scope of the invention shall be limited to the exact forms shown or otherwise than by the terms of the appended claims.

What is claimed is:

1. In airplane construction, an elongated sectional member comprising an outer skin, a corrugated sheet secured to said skin, and a flanged connecting member having a portion lying in contact with and secured to said skin and another portion shaped to conform with and secured to said corrugated sheet.

2. In airplane construction, an elongated sectional member comprising an outer skin, a corrugated sheet secured to said skin with the corrugations extending longitudinally and a flanged connecting member having a shouldered portion lying in contact with and secured to said skin and another portion shaped to conform with and secured to said corrugated sheet.

3. In airplane construction, an elongated sectional member comprising an outer skin, a corrugated sheet secured to the skin with the corrugations extending longitudinally of said member, said sheet terminating short of the end of the skin, and a connecting member having a flanged portion beyond the end of the skin, a shouldered portion lying against and secured to the end of the skin and a second shouldered portion corrugated to correspond to said sheet and secured to the end of the sheet.

4. In airplane construction, an elongated sectional member comprising a sheet metal skin shaped to form a closed section, a corrugated sheet secured to the inner side of said skin with its corrugations extending longitudinally of the member, and means for securing said member to a similar member including flanged connecting members secured to the skin and having portions corrugated to fit and secured to the sheets and extending substantially completely around said section.

5. In airplane construction, an elongated sectional member comprising a sheet metal skin shaped to form a closed section, a corrugated sheet secured to the inner side of said skin with its corrugations extending longitudinally of the member, and means for securing the sections of said member together comprising connecting members secured to the skin and having portions corrugated to fit and secured to the sheet at the ends of the sections and extending substantially completely around the sections, and means for securing the connecting members together.

HENRY A. BERLINER.